Nov. 15, 1955  M. M. SEELOFF  2,724,035
ACTUATING AND CONTROL MECHANISM FOR ELECTRIC
RESISTANCE FLASH-BUTT WELDER
Filed July 2, 1952  3 Sheets-Sheet 1

INVENTOR
MELVIN M. SEELOFF

BY *Francis J. Klempay*
ATTORNEY

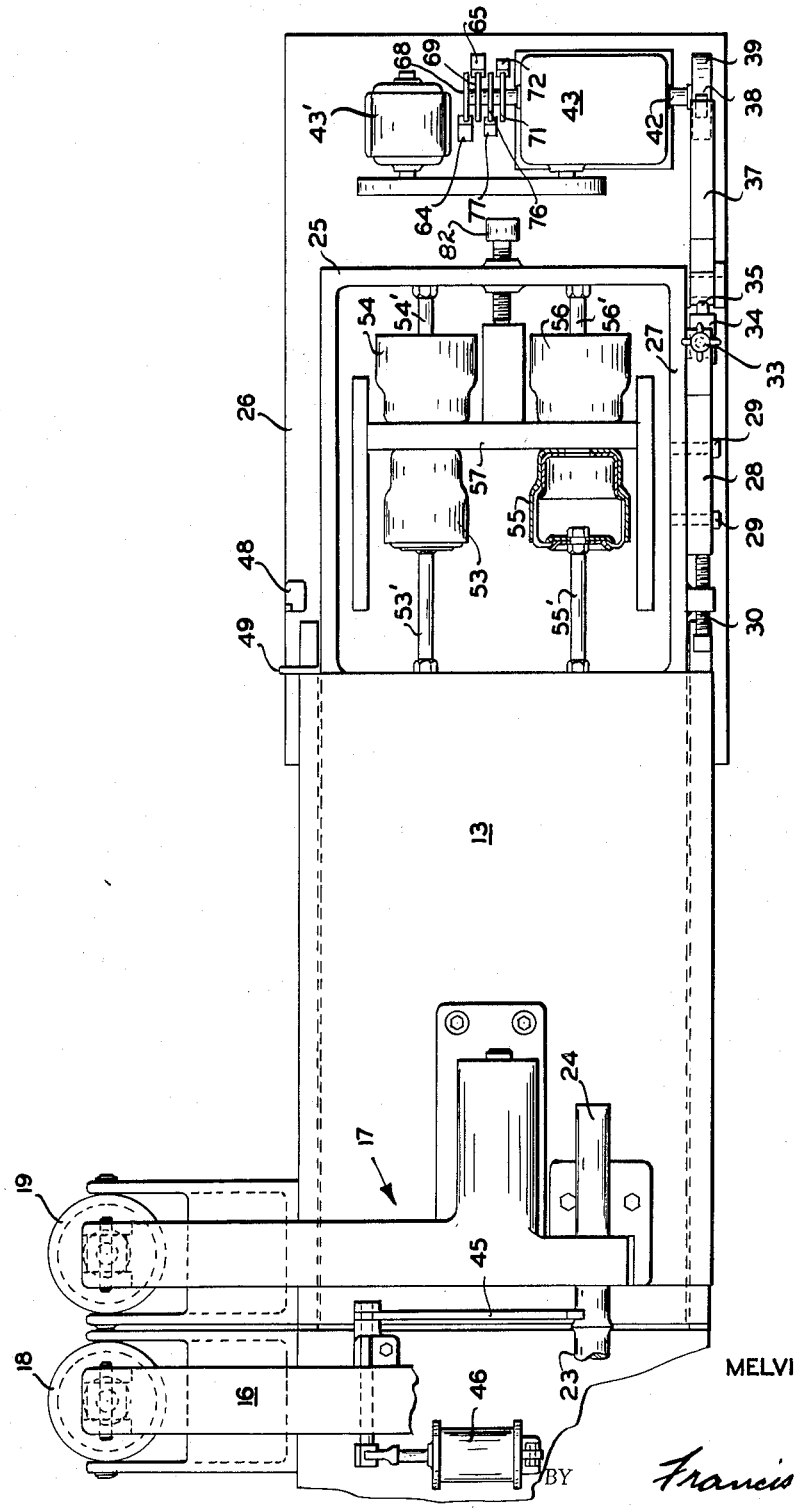

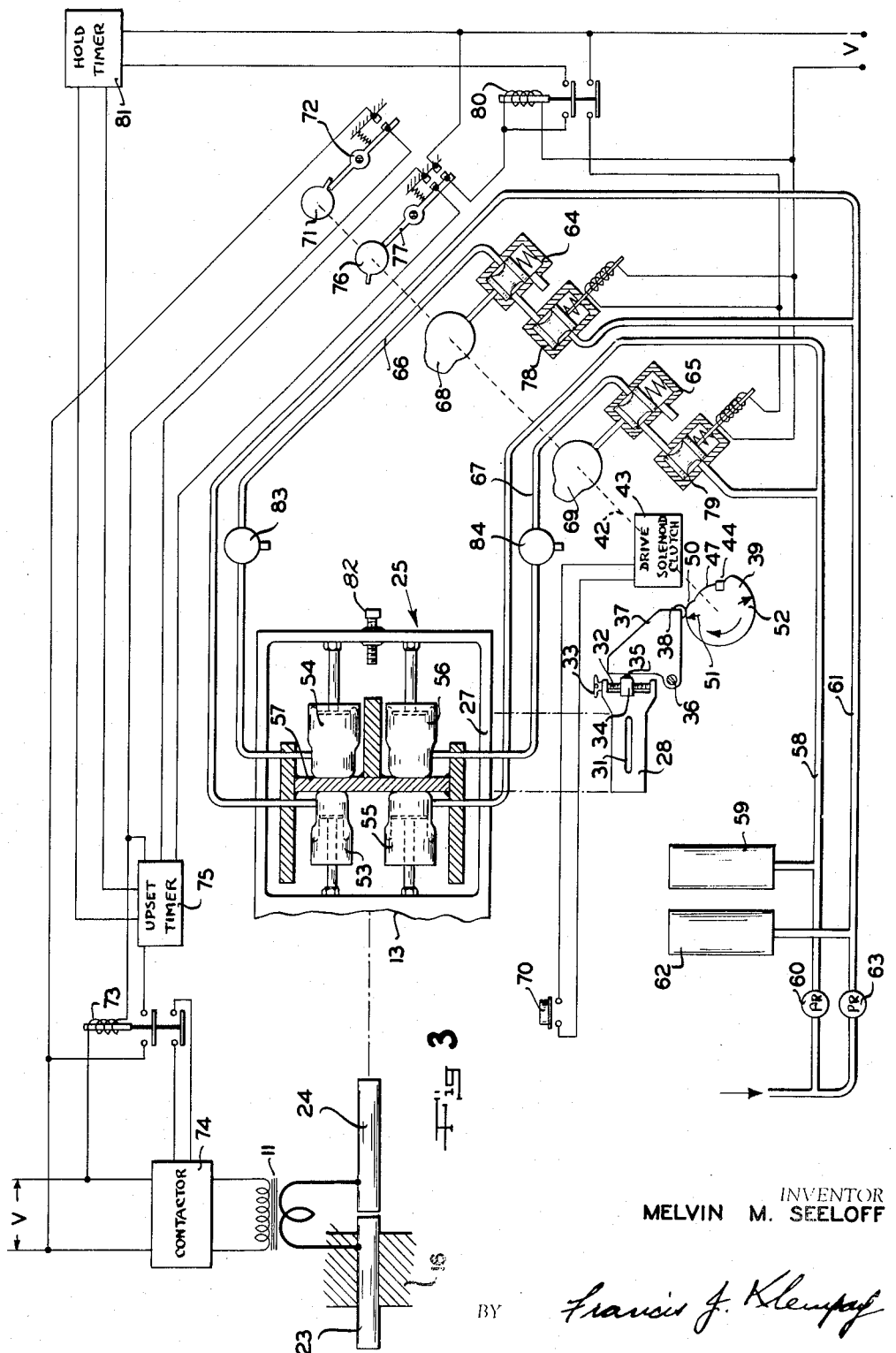

United States Patent Office 2,724,035
Patented Nov. 15, 1955

2,724,035

ACTUATING AND CONTROL MECHANISM FOR ELECTRIC RESISTANCE FLASH-BUTT WELDER

Melvin M. Seeloff, Warren, Ohio, assignor to The Taylor-Winfield Corporation, Warren, Ohio, a corporation of Ohio Application July 2, 1952, Serial No. 296,796

7 Claims. (Cl. 219—4)

This invention relates generally to the art of electric resistance welding and more particularly to improved apparatus for effecting and controlling the movement of a work-holding platen in flash-butt welding apparatus. As is well understood in the art, unless a machine of this kind is specifically designed and constructed for a single welding operation, it is necessary that the machine have incorporated in it practical and readily manipulatable means for adjusting the various sequential operations of the flash-butt welding cycle, such as initial die spacing, length and rapidity of flashing or burn-off, and length and speed of upset. Since the procedural pattern varies widely for this work a versatile or practical machine must be capable of rapid adjustment not only in the above outlined steps but also in the matter of precise control in the upset force applied and in some cases varying the upset force applied during the upsetting portion of the welding cycle. It is accordingly the primary object of the present invention to provide an improved apparatus for effecting and controlling the movement of the movable platen of an electric resistance flash-butt welding machine through all phases of the complete cycle of movement of the platen, and including provision for the quick adjustment of each phase, as may be required for any particular welding operation.

A further and more specific object of the invention is the provision in an electric resistance flash-butt welding machine of an improved arrangement for utilizing a mechanical cam for effecting the flashing movement of the movable platen of the machine according to a predetermined time-position pattern dictated by the cam, while employing a pneumatic actuator having low friction and inertia characteristics to effect the upsetting movement of the platen whereby the advantageous apparatus disclosed and claimed in U. S. Patent No. 2,499,281, owned by the assignee of the present invention and application, may be more practically and more comprehensively employed. According to the present invention the pneumatic upset actuator is maintained under predetermined elastic resistance during the flashing movement of the movable platen of the machine and the mechanical reaction of this actuator is transmitted not back through the mechanical flashing actuator but rather to a rigid fixed part of the machine frame so that the complete cycle of movement of the platen during a welding cycle is smooth and uninterrupted, and precisely controlled whereby improved welding results may be obtained. Also, this arrangement materially reduces the size and strength of the mechanical parts required on the machine and reduces their wear and tear to a minimum.

Another object of the invention is the provision in an electric resistance flash-butt welding machine of an improved and simplified arrangement for controllably changing the closing force applied to the work pieces during the upsetting movement of the movable platen of the machine, and for precisely controlling the force values at the different levels. For this purpose the apparatus of this invention employs a pair of opposed expansible chambers of low friction and inertia characteristics wherein the linear force exerted by one of the chambers is in opposition to the linear force exerted by the other of the chambers in a direction closing the work pieces. By properly selecting the physical size of these respective chambers and by controlling the fluid pressure applied to the respective chambers an accurate control of the driving force applied may be effected and, further, by suddenly exhausting the fluid pressure from one or the other of the chambers a sudden change in the force applied may be effected at any stage of the upset movement.

A still further object of the invention is the provision in electric resistance flash-butt welding apparatus of an improved arrangement for effecting an initial limited retraction of the movable platen of the apparatus after the work pieces are clamped in place and preparatory to the initiation of the flashing movement to the paten to permit the quick retraction of a gauge bar which is commonly inserted between the work pieces as the latter are loaded into the apparatus. In accordance with this invention such initial limited retraction of the movable platen is readily accomplished by the opposed pneumatic actuators above mentioned, and no provision need be made in the mechanical apparatus of the assembly for effecting the same.

The above and other objects and advantages of the invention will become apparent upon consideration of the following detailed specification and accompanying drawing wherein there is disclosed a preferred embodiment of the invention.

In the drawing:

Figure 2 is an enlarged fragmentary top plan view of the apparatus of Figure 1 showing further details of the actuating and control mechanism; and Figure 3 is a schematic representation of fluid and electrical operating circuits which may be incorporated with the mechanism of my invention.

Figure 1:
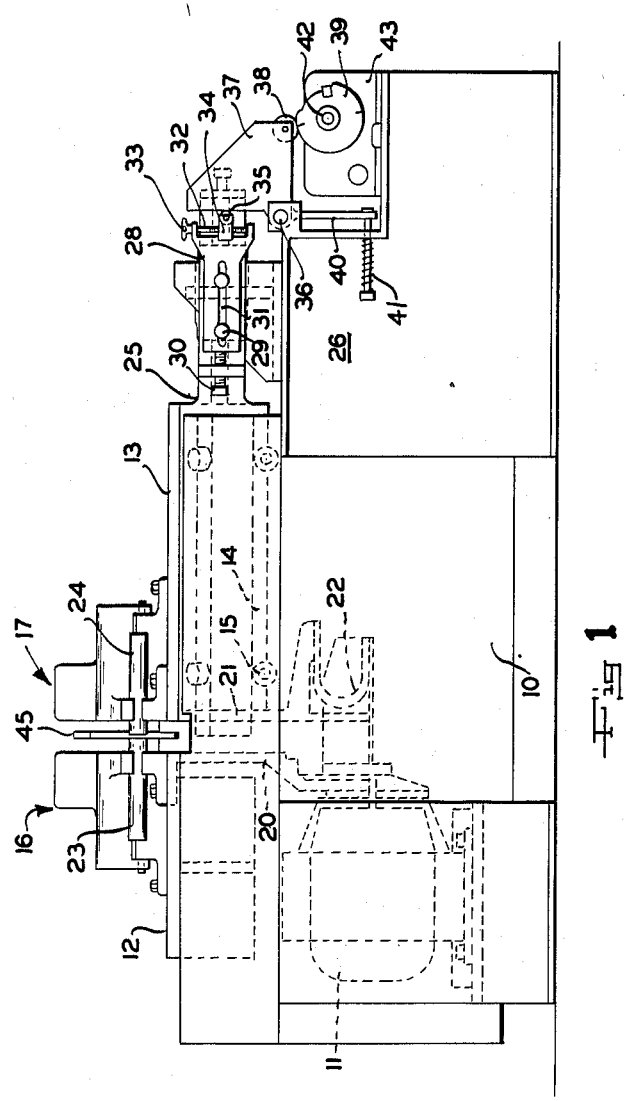
Figure 1 is a front elevation of a flash-butt welding machine utilizing an actuating and control mechanism as taught by my invention.

Referring initially to Figure 1, the numeral 10 designates the fixed base member of a flash-butt welding machine, and in accordance with known welder construction the base 10 houses a welding transformer 11 and supports fixed and movable work-holding platens 12 and 13 respectively. The fixed platen 12 is, of course, rigidly secured to the base member 10, while the movable platen 13 is supported by ways 14 and bearings 15 for antifrictional movement toward or away from the fixed platen 12.

In the illustrated apparatus the platens 12 and 13 carry current conducting work holding clamps 16 and 17 respectively which clamps are preferably power operated by means of pneumatic or hydraulic actuators 18 and 19 mounted respectively on the fixed and movable platens 12 and 13. A rigid buss bar 20 connects the work holding jaws of the fixed clamp 16 to one terminal of the welding transformer 11, and the other terminal of the transformer connects the jaws of the movable clamp 17 through rigid and flexible conductors 21 and 22.

In accordance with established electric resistance welding practice, workpieces 23 and 24 are firmly held in the clamps 16 and 17 and the movable platen 13 is caused to move toward the fixed platen 12 at a predetermined time rate whereby the ends of the workpieces 23 and 24 are first burned or flashed off and heated to welding temperature, and then jammed together or upset to weld the pieces together. The present invention teaches a novel arrangement of accurately controllable and readily adjustable cam means for effecting movement of the platen 13 during the flashing phase of the welding operation, and in combination with the aforesaid cam means, a quick-acting and relatively high powered pneumatic actuating means for effecting movement of the platen 13 during the upset phase of the welding operation.

As illustrated in Figures 1 and 2 my actuating means includes a yoke member 25 which is rigidly secured to the movable platen 13, extending rearwardly thereof over an end portion 26 of the base 10. Secured to one side leg 27 of the yoke 25 and adapted for adjustable movement therealong in a direction toward or away from the fixed platen 12 is a driving bracket 28 through which the operating force is transmitted from the cam mechanism to be hereafter described. The driving bracket 28 is normally rigidly secured to the yoke 25 by means of bolts 29, but adjustment may be effected by first loosening the bolts 29 and appropriately manipulating an adjusting screw 30 which is mounted on and referenced to the yoke 25. A suitable slot 31 is provided in the driving bracket 28 so that the same may be adjusted relative to the bolts 29 after merely loosening the latter.

In accordance with the teachings of my invention the rearward or right hand end of the driving bracket 28 is provided with spaced journal portions for rotatably mounting an adjusting screw 32; the latter having an operating handle 33 positioned atop the bracket 28 for ready access by a machine operator. Carried by the adjusting screw and adapted to bear against the end surface of the bracket 28 is a driving block 34 having an anti-frictionally journaled follower wheel 35.

Pivotally mounted at 36 to the end portion 26 of the base is a bell crank lever 37 having a driving face adapted to bear against the follower wheel 35 whereby in response to suitable pivotal movement of the lever 37 the platen 13, through the driving block 34 and bracket 28, may be cause to move toward or away from the fixed platen 12. The lever 37 carries a follower wheel 38 at the end extremity of its lower leg, and as illustrated in Figure 1 the wheel 38 is adapted to bear against an operating or flashing cam 39 which is contoured in accordance with the requirements of the apparatus so that upon rotation of the cam 39 a desired movement may be imparted to the movable platen 13. The wheel 38 is maintained at all times in slight pressure contact with the cam 39 by means of arm 40 which depends downwardly from the lever 37 and is drawn in a clockwise direction by a spring 41 acting between the fixed base 10 and the arm 40.

In the present embodiment of the invention the flashing cam 39 is supported and rotated by the output shaft 42 of a conventional variable speed drive unit 43 which preferably includes a solenoid operated clutch mechanism, not shown, whereby the drive may be readily engaged and disengaged from a remote control station. A synchronous or other constant speed type electric motor 43' comprises the source of driving power for the drive unit 43.

Cam 39 is utilized primarily for controlling the movement of the movable platen 13 during the burn off or flashing portion of the welding phase. But in accordance with the preferred mode of operation a complete welding operation, i. e., the steps of loading and spacing the workpieces and the welding phases of flashing, upset and holding after upset, and subsequent unloading of the workpieces and retraction of the platen 13, is to be completed in a single revolution of the cam 39. The cam is therefore provided with surface portions suitable for causing or permitting each of the above mentioned operations or phases to take place. Thus, I contemplate that when the follower wheel 38 rests on a spacer block 44 carried by the cam 39 and the follower wheel 35 is in engagement with the driving face of the bellcrank lever 37 the platens 12 and 13 will be relatively spaced at a proper distance for loading the workpieces 23 and 24 onto the clamps 16 and 17. Proper relative spacing of the workpieces is accomplished through the use of a retractible spacer bar 45 which is carried by the fixed platen 12 and adapted to be moved into or out of operative position by means of an air cylinder 46.

As the cam 39 is rotated in a clockwise direction from the "work-loading" position the follower wheel 38 drops off of the block 44 and onto a recessed surface portion 47 of the cam 39. A rearwardly directed force applied to the movable platen 13, by means to be hereafter described, causes the platen to retract to maintain the follower wheel 35 in engagement with the driving face of the lever 37. The pressure on the sides of the spacer bar 45, caused by the action of the clamps 16 and 17 on work pieces 23 and 24, is thus released, after which the spacer bar 45 may be moved to a retracted position by appropriate application of fluid pressure to the cylinder 46. This is preferably accomplished through means including a limit switch 48 mounted on the end portion 26 of the base 10; an operator 49 for the switch 48 being carried on the movable platen 13 in suitable position to actuate the switch 48 upon retraction of the platen as aforesaid.

After the spacer bar 45 has been retracted the platen 13 is moved quickly forward to close the gap between the work pieces so that the flashing phase may be properly carried out. This rapid movement is effected by an abrupt riser portion 50 of the cam 39 which immediately follows, in time relation, the recessed portion 47. At or about the point indicated by the arrow at 51, flashing of the workpieces is initiated, and this phase continues until the point indicated by the arrow 52 underlies the follower wheel 38; it being understood that the cam 39 is provided with a "rising" surface in this portion whereby the platen 13 is caused to have a continuous forward movement to bring the workpieces closer together.

In accordance with the desired ends of the invention the upset phase of the welding cycle is initiated at the end of the flashing phase. And in the latter phase the platen 13 is moved rapidly and forcefully forward to fuse the heated ends of the workpieces.

To effect upset movement of the platen 13 in the manner desired I have provided a plurality of low-inertia diaphragm type pneumatic actuators 53—56 which are arranged in opposed pairs as illustrated in Figure 2 and are rigidly secured by means of a bracket 57 to the rear end portion 26 of the base 10. As further illustrated in Figure 2, the actuators 53—56 are positioned within the yoke 25, and oppositely directed operating rods 53'—56' of the opposed pairs of actuators are rigidly connected to the platen 13 and rear leg of the yoke 25 respectively so that upon application of fluid pressure to certain of the actuators the platen 13 will be caused to move in one direction, while upon application of pressure to certain others of the actuators the platen 13 will move in the opposite direction.

According to the preferred construction of the invention fluid pressure is applied to each of the actuators of an opposed pair thereof from a common source so that the operating pressure will be substantially identical in each of the opposed actuators. Thus, for example, actuators 55 and 56 may be supplied from a source including conduit 58, accumulator tank 59 and pressure regulating valve 60, while actuators 53 and 54 may be supplied from a source including conduit 61, tank 62 and regulating valve 63, all as illustrated in Figure 3.

Also in accordance with the preferred construction of the invention actuators 55 and 56 are substantially identical in size so that when pressure is applied to both of the said actuators no unbalanced force is applied to the platen 13, while actuator 53 is somewhat smaller in effective area than is actuator 54 so that when pressure is applied to the last mentioned actuators through conduit 61 an unbalanced force is applied to the platen 13 in a direction tending to retract the same from the fixed platen 12. It will thus be observed that when pressure is applied to all actuators the platen 13 will be biased toward a retracted position wherein the follower wheel 35 is in engagement with the driving face of bellcrank lever 37.

This effect is utilized in obtaining accurate movement of the platen 13 in response to rotation of the flashing cam 39.

For controlling the operation of the platen 13 through the actuators 53—56 I have provided valves 64 and 65 in conduits 66 and 67 respectively leading to actuators 54 and 56 respectively, which actuators are arranged to act on the rear leg of the yoke 25. Valves 64 and 65 are conventional three-way valves and are arranged to be operated by control cams 68 and 69 mounted on the output shaft 42 of the drive unit 43. The cams 68 and 69 provide that valves 64 and 65 normally connect actuators 54 and 56 with the source of pressure therefor, and that upon a predetermined rotation of the shaft 42 and flashing cam 39, namely, after completion of the flashing operation, one or both of the valves 64 and 65 will exhaust the cylinder associated therewith to create an unbalanced force upon the platen 13 tending to move the same in a forward direction.

In the present embodiment actuators 53 and 55 are at all times in communication with the source of pressure therefor whereby movement of the platen may be controlled merely by exhausting or applying pressure to the actuators 54 and 56; it being understood that application of pressure to all actuators will cause the platen to retract by virtue of the area differential between actuators 53 and 54.

In a normal "single pressure" upset operation valves 64 and 65 will be opened simultaneously to exhaust both actuators 54 and 56 to immediately apply a maximum upset force to the workpieces. However, if "double pressure" upset is desired the cams 68 and 69 may be offset a predetermined amount whereby one of the valves 64 or 65 will open before the other. In this manner a sequential application of upset force may be obtained.

Various combinations of double pressure upset may be provided for by regulating the pressures applied to the opposed pairs of actuators by means of valves 60 and 63. For example, by increasing the pressure in one opposed pair of actuators while reducing the pressure a commensurate amount in the other pair the same total upset force is provided while the sequential application thereof may be varied.

A normal welding cycle is begun with the platen 13 retracted as far as possible preparatory to the loading of workpieces 23 and 24. The apparatus is in "work loading" position when the follower wheel 38 engages the spacer block 44, and it will be observed that the platen position at the "work loading" position may be varied by shifting the driving bracket 28 longitudinally with respect to the yoke 25 to which it is secured.

After the workpieces are properly spaced and held by the clamps 16 and 17 a starting switch 70 is closed to engage the solenoid clutch, not shown, of the drive unit 43, and thereupon the flashing cam 39 begins to rotate at a preselected speed according to the setting of the variable drive 43. As the cam 39 rotates, the platen 13 makes an initial retracting movement to release and permit retraction of the spacer bar 45, whereupon the platen is moved forwardly against the restraining force of the opposed pair of actuators 53 and 54.

Flashing of the workpieces 23 and 24 is begun as the cam 39 rotates to a point wherein the arrow 51 underlies the follower wheel 38. The flow of welding current is initiated at this time by means of a cam 71, carried by the shaft 42, which engages and closes a normally open switch 72. The switch 72, when closed, energizes a relay 73 which in turn energizes a weld contactor 74 causing welding current to pass through the transformer 11 and to the workpieces 23 and 24. In the illustrated control arrangement the switch 72 is closed only momentarily and the weld relay 73 is maintained in an energized condition by means of a holding circuit including an "upset timer" 75 to be hereafter described.

Proper movement of the platen 13 during flashing is effected by the cam 39 which causes the bellcrank lever 37 to rock in a counter-clockwise direction against the follower wheel 35. And it will be particularly noted that the movement of the platen 13 corresponding to a predetermined rotation of the cam 39 may be accurately and readily varied by rotating the operating handle 33 to move the drive block 34 and follower wheel 35 carried thereby toward or away from the pivot point 36 of the lever 37.

Upon the cam 39 moving into a position wherein the arrow 52 underlies follower wheel 38, the upset phase of the operation is initiated. This is effected by cams 68 and 69 which operate valves 64 and 65, either simultaneously or sequentially, so that an unbalanced upset force is applied to the platen 13. Control of platen movement by the cam 39 is at this time rendered ineffective since the drive block 34 merely moves out of engagement with the driving surface of the lever 37 by virtue of the upsetting force applied through the actuators 53 and/or 55.

To insure rapid and responsive upset movement of the platen 13 it may be desirable to include in the pneumatic circuits for the actuators 54 and 56 conventional "quick release" valves 83 and 84 which operate responsive to a slight pressure drop in the actuators 54 and 56 to open to provide a low resistance exhaust path from the actuators 54 and 56 to the atmosphere.

After both valves 64 and 65 have been operated by cams 68 and 69 to exhaust actuators 54 and 56 a control cam 76 engages a normally open switch 77 to energize and close a pair of solenoid operated valves 78 and 79 through the intermediary of a control relay 80. The valves 78 and 79 operate independently of the valves 64 and 65 to disconnect actuators 54 and 56 from the sources of air therefor so that these actuators may be maintained in an exhausted condition after cams 68 and 69 have rotated a sufficient amount to release valves 64 and 65. The control relay 80 is energized but momentarily by switch 77 and is thereafter held in an energized condition through a circuit including a "hold timer" 81 which is associated with and energized by the upset timer 75.

In addition to energizing valves 78 and 79, the switch 77, when closed by cam 76, energizes the upset timer 75 which thereafter regulates, on a time basis, the amount of welding current applied to the workpieces 23 and 24. Where desired, additional circuit means, not shown, may be incorporated whereby the upset timer 75 may be used to regulate, as well as time the upset current. Apparatus of this nature is well known in the welding art.

When the upset timer 75 times out, relay 73 is released and the contactor deenergized to stop the flow of welding current. At this time the hold timer 81 is energized, and the latter control component determines the length of time after completion of the upset operation before the relay 80 and valves 78 and 79 are released to admit air to actuators 54 and 56 to cause retraction of the platen 13. During the "hold" interval the fused workpieces 23 and 24 are removed from the welding apparatus.

Movement of the platen 13 during the "upset" phase of the welding cycle may be regulated by appropriate setting of a screw 82 to determine the final opening of the dies after upset, and regulating from this reference point the point at which the upset phase is initiated. Thus, for a predetermined desired final die opening, upset travel of the platen 13 may be regulated by rotating the adjusting screw 30 to shift the driving bracket 28 forwardly or rearwardly with respect to the yoke 25 to respectively increase or decrease the upset movement.

As should now be apparent, my apparatus provides an extremely versatile and wholly practical control and actuating arrangement for flash-butt welding apparatus which provides accurate and readily adjustable control of all important phases of a welding cycle. The disclosed control integrates in a most effective manner the accuracy and controllability of a cam operated movement with the advantageous characteristics of low-inertia pneumatic actuators so that a complete welding cycle may be carried out in a most expeditious and effective manner, producing consistently good welding results for all work requirements within the capacity limits of the welding apparatus.

My invention teaches the novel use of a plurality of opposed pairs of single-acting pneumatic actuators whereby upsetting force may be applied to the work in various proportions of the total available force so that the platen movement may be most effectively tailored to the work requirements.

For simple welding apparatus of limited requirements, a single pair of opposed actuators may suffice. However, the control versatility of my apparatus is wholly retained in such an arrangement as will be readily apparent.

Thus, the invention should not be considered as limited to the embodiment illustrated and specifically described herein, and reference should be had to the appended claims in determining the full scope of the invention.

I claim:

1. In an electric resistance flash-butt welding apparatus of the kind having a movable platen a fixed supporting frame, a bracket rigidly mounted on said frame, means constituting a double-acting pneumatic motor of the diaphragm type mounted on said bracket and having operating rod means connected to said movable platen whereby said movable platen may be moved in opposite directions by the application of fluid pressure to one or the other of the chambers of the motor, a yoke secured to said platen and having its arms extending on opposite sides of said bracket in generally parallel relation to the axis of movement of said platen, a bellcrank lever pivotally mounted on said frame on the side of the base of said yoke opposite said bracket for rocking movement about an axis generally transverse to said first mentioned axis, one leg of said lever extending generally parallel to the outer face of said base of said yoke, a drive block interposed between said one leg of said lever and said face, means mounting said block for adjustable movement toward and away from the axis of rotation of said lever whereby the drive ratio between said lever and yoke may be varied, and a motor driven cam engaging the other leg of said lever to rock said lever about its pivotal axis.

2. In electric resistance flash-butt welding apparatus of the kind having a fixed platen and a movable platen the combination of a diaphragm type of rectilinear fluid motor fixedly mounted with respect to said fixed platen and having reciprocating drive rod means connected to said movable platen for moving the latter toward said fixed platen, a lever pivotally mounted for rocking movement about an axis generally transverse to the axis of movement of said movable platen and having a driving face lying substantially in a plane normal to the axis of movement of the movable platen, means to pivot said lever according to a predetermined time-position pattern, a drive block mounted on said movable platen, said lever being positioned to contact said drive block whereby said lever may move said movable platen toward said fixed platen independently of said motor and vice versa, means adjustably mounting said drive block on said movable platen whereby the distance between said drive block and the pivotal axis of said lever may be varied to change the driving ratio of said lever, and indicia bearing means on said platen to indicate the adjusted position of said drive block on said platen.

3. Apparatus according to claim 2 further characterized in that said means for mounting said drive block comprises a separable member adjustably mounted on said platen for movement toward and away from said fixed platen.

4. In electric resistance flash-butt welding apparatus of the kind having a moveable platen, an improved platen drive comprising double-acting pneumatic motor means having opposed pressure chambers and means connecting said platen, means to normally maintain pressure in said opposed chambers to cause a slight unbalance of forces therein whereby said platen normally tends to move in a first direction, a bell crank lever arranged in parallel with said motor means for moving said platen in a second direction, and means operative upon a predetermined movement of said lever to exhaust one of said opposed chambers whereby said platen continues to move in said second direction independently of said lever.

5. Apparatus according to claim 4 further including a cam for operating said lever, and means to adjust the driving ratio between said lever and said platen.

6. Apparatus according to claim 5 further characterized by said means to adjust comprising a driving block carried by said platen, and means to adjust the position of said driving block toward and away from the pivotal axis of said lever.

7. In electric resistance flash-butt welding apparatus of the type having a movable platen and separate cam and pneumatic means for moving said platen, the improvement comprising means operative upon a predetermined movement of said cam to condition said pneumatic means for moving said platen independently of said cam, and adjustable drive means interconnecting said platen and cam whereby the movement of said platen resulting from said predetermined movement of said cam may be varied.

References Cited in the file of this patent

UNITED STATES PATENTS

| | | |
|---|---|---|
| 2,409,850 | Hackett | Oct. 22, 1946 |
| 2,499,281 | Riley | Feb. 28, 1950 |
| 2,509,606 | McPhee | May 30, 1950 |
| 2,640,134 | Doutt | May 26, 1953 |